Patented May 12, 1953

2,638,467

UNITED STATES PATENT OFFICE 2,638,467

PROCESS FOR THE MANUFACTURE OF ORGANIC NITROGEN-CONTAINING COMPOUNDS

Ian Heilbron, Arthur Herbert Cook, and Anthony Lewis Levy, London, England, assignors to Beecham Research Laboratories Limited, London, England, a British company No Drawing. Application January 21, 1949, Serial No. 72,064. In Great Britain January 26, 1948

4 Claims. (Cl. 260—112)

This invention relates to the manufacture of organic nitrogen-containing compounds.

According to the present invention a process is provided for the manufacture of amides of the general formula:

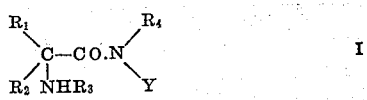
I wherein a compound of the general formula:

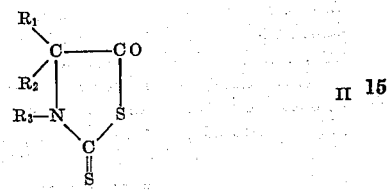
II is reacted with a compound of the general formula:

III where $R_1$, $R_2$, $R_3$ and $R_4$ are the same or different and are hydrogen or an unsubstituted hydrocarbon residue, and Y is a substituted hydrocarbon residue.

The compound of the general formula:

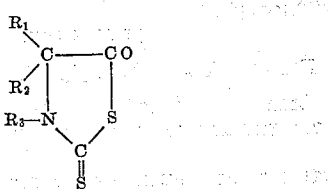

is preferably 2-thiothiazolone or a derivative thereof.

The compound of the general formula:

may be a derivative of glycine.

According to an embodiment of the invention a process is provided for the manufacture of amides of the general formula:

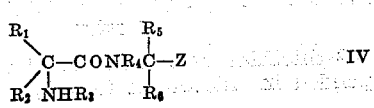
IV wherein a compound of the general formula:

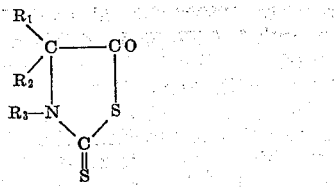

is reacted with a compound of the general formula:

wherein $R_1$, $R_2$, $R_3$ and $R_4$ have the same meanings as above, $R_5$ and $R_6$ are the same or different and are hydrogen or an unsubstituted hydrocarbon residue, and Z is a carboxyl, esterified carboxyl, amide or substituted amide or nitrile group.

Preferably, of the pairs of substituents $R_1$, $R_2$ and $R_5$, $R_6$ one of each pair is hydrogen, while the other is an unsubstituted hydrocarbon residue.

It will be seen that the compounds of the present invention may be regarded as amides derived from α-amino acids of the general formula:

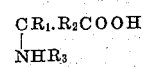

which may be of the kind found in nature such as glycine or purely synthetic amino acids, e. g., phenylglycine, not found in nature.

According to a further feature of the invention the compound of the general formula:

itself may be an amino acid derivative when Z is itself of polyamidic or polypeptidic nature.

This aspect of the invention may be regarded as reacting under selected conditions a compound of the general Formula II with a substituted amino compound $A.NHR_4$, where A is the complement of an amino acid or peptide molecule or of a functional derivative of the same such that the group $NHR_4$ retains its basic function unimpaired; the result is that the original compound $A.NHR_4$ is converted into a new compound $A.NR_4.CO.CR_1R_2.NHR_3$ with extension of the peptide chain.

The compounds of general Formula II may be obtained by a variety of means. For example, compound VI may be prepared by treating

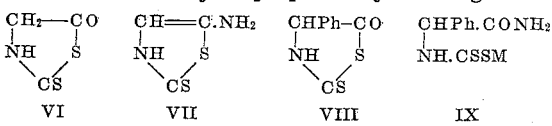

the compound VII with cold 2N aqueous mineral acid when the heterocyclic product is precipitated. Again, the compound VIII may be prepared by acidifying an aqueous solution of a dithiocarbamic salt (IX) where M is an inorganic or organic cation, when the heterocyclic product is precipitated. The compounds of the general Formula III and the general Formula V may be prepared by orthodox means or may, as some of the following examples illustrate, themselves be prepared by the application of the process of the present invention.

When a compound of the type II is allowed to react, preferably at room temperature, with an amine $A.NHR_4$ in a basic medium it is believed that the first reaction consists of a ring-fission with formation of a salt or a dithiocarbamic acid; if the solution at this stage be made acid in reaction, the elements of carbon disulphide are believed to be eliminated with formation of the new peptide. In the former case the reactions which appear to take place may be represented thus:

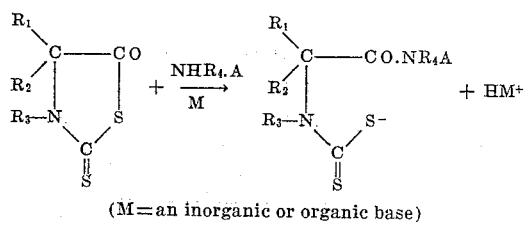

(M = an inorganic or organic base)

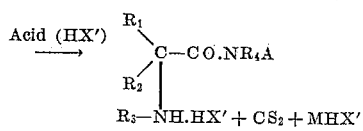

The removal of carbon disulphide may be facilitated by treating the solution containing the dithiocarbamate salt with an agent capable of combining with carbon disulphide and so assisting its removal.

In these syntheses a basic reaction in the medium may be achieved by the use of any inorganic or organic base which, under the experimental conditions employed does not compete with the second component in its ring-fission of the first component; for this reason a tertiary organic base is often convenient. The basic reaction of the medium may in many instances be achieved by employing two or more molecular proportions of the second component instead of the one molecular proportion which enters into permanent combination in the peptide product.

The following examples illustrate how the process of the invention may be carried into effect:

EXAMPLE 1

*Preparation of glycylglycine ethyl ester*

2-thiothiazolone (0.66 gm.; 1 equiv.) was suspended in chloroform (10 cc.) and treated at 0° C. during 15 minutes with a mixture of glycine ethyl ester (0.51 gm.; 1 equiv.) and triethylamine (0.50 gm.; 1 equiv.) in chloroform (2 cc.). After standing for a further 15 minutes at 0° C., the solution was acidified with 10 N ethanolic hydrogen chloride (1 cc.), and the glycylglycine ester hydrochloride, M. P. 181–182° C. which had separated (0.57 gm.; 57% of theory) collected after 2 hours at 0° C.

EXAMPLE 2

*Preparation of glycylglycylglycine ethyl ester*

2-thiothiazolone (0.66 gm.; 1 equiv.) was suspended in ethanol (5 cc.) and treated with a solution of glycylglycine ethyl ester hydrochloride (0.98 gm.; 1 equiv.) in methanol (5 cc.) containing triethylamine (1.0 gm.; 2 equivs.). The resulting solution was acidified after 2 minutes with 10 N ethanolic hydrogen chloride (1 cc.), and the glycylglycylglycine ester hydrochloride, M. P. 217° C., which rapidly crystallised (1.02 gms.; 81% of theory) collected after 15 minutes at 0° C.

EXAMPLE 3

*Preparation of glycylglycylglycylglycine ethyl ester ("Biuret base")*

2-thiothiazolone (0.66 gm.; 1 equiv.) was suspended in methanol (10 cc.) and treated with a solution of glycylglycylglycine ethyl ester hydrochloride (1.26 gms.; 1 equiv.) in methanol (15 cc.) containing triethylamine (1.0 gm.; 2 equivs.). The clear solution was acidified after 15 minutes with 10 N ethanolic hydrogen chloride (1 cc.) when "biuret base" hydrochloride (1.2 gms.) separated at once. A further 0.16 gm. (total yield=88% of theory) of pure hydrochloride, M. P. 215–216° C. was removed from the filtrate after 30 minutes. The main crop recrystallised well from water-ethanol, containing a little free hydrogen chloride, in sparkling platelets, M. P. 216–217° C. (decomp.).

EXAMPLE 4

*Preparation of phenylglycylglycylglycine ethyl ester*

4-phenyl-2-thiothiazolone (0.52 gm.; 1 equiv.) in ethanol (10 cc.) was treated with a solution of glycylglycine ethyl ester (0.4 gm.; 1 equiv.) and triethylamine (0.25 gm.; 1 equiv.) in ethanol (10 cc.). After 25 minutes, the solution was acidified with 10 N ethanolic hydrogen chloride (1.5 cc.) and phenylglycylglycylglycine ethyl ester hydrochloride, M. P. 240° C. (decomp.), collected after 30 minutes at 0° C. (0.3 gm.; 37% of theory).

EXAMPLE 5

*Preparation of tetraglycylglycine ethyl ester*

"Biuret base" hydrochloride (0.78 gm.; 1 equiv.) was warmed with a mixture of triethylamine (0.50 gm.; 2 equivs.), methanol (15 cc.) and water (2 cc.) until dissolved, rapidly cooled, and then treated with a suspension of 2-thiothiazolone (0.33 gm.; 1 equiv.) in methanol (10 cc.). After 30 minutes at room temperature, the solution was acidified with 10 N ethanolic hydrogen chloride (1.5 cc.) and the tetraglycylglycine ethyl ester hydrochloride which rapidly separated (0.70 gm.; 76% of theory), collected after 15 minutes at 0° C. The compound was recrystallised from water-methanol, containing a little free hydrogen chloride, in laths, M. P. 233–234° C. (decomp.).

EXAMPLE 6

*Preparation of glycyl-DL-phenylalanine methyl ester*

2-thiothiazolone (0.66 gm.; 1 equiv.) was suspended in chloroform (5 cc.), and treated with a solution of DL-phenylalanine methyl ester hydrochloride (1.08 gms.; 1 equiv.) in chloroform (7.5 cc.) containing triethylamine (1 gm.; 2 equivs.). After 30 minutes the solution was acidified with 10 N ethanolic hydrogen chloride (2 cc.), and the glycyl-DL-phenylalanine methyl ester hydrochloride, M. P. 166° C., which slowly separated (0.39 gm.; 29% of theory), collected after 4.5 hours at 0° C.

EXAMPLE 7

*Preparation of glycylglycylglycine ethyl ester*

2-thiothiazolone (0.66 gm.; 1 equiv.) in ethanol (15 cc.) was treated with a solution of glycylglycine ethyl ester (1.6 gms.; 2 equivs.) in ethanol (10 cc.). After 10 minutes the solution was acidified with 10 N ethanolic hydrogen chloride (1 cc.; 2 equivs.), when a solid mass (1.2 gms.; 96% of theory) of glycylglycylglycine ethyl ester hydrochloride, M. P. 213° C. (decomp.), was soon precipitated. Glycylglycine ester hydrochloride, M. P. 180–181° C., separated from the filtrate on standing.

EXAMPLE 8

*Preparation of glycylglycine ethyl ester hydrochloride (triethylphosphine method)*

2-thiothiazolone (0.67 gm.) was treated with triethylphosphine (0.6 gm.; 1 equiv.) and glycine ethyl ester (0.51 gm. 1 equiv.) in chloroform (13 cc.). After 20 hours at room temperature, ethanolic hydrogen chloride was added to precipitate glycylglycine ethyl ester hydrochloride (0.72 gm.; 73%), M. P. 174–176° C.

EXAMPLE 9

*Preparation of DL-alanylglycine*

DL-4-methyl-2-thiothiazolone (0.735 gm.) was dissolved in 0.987 N potassium hydroxide (5.2 cc.; 1 equiv.) and a solution of glycine (0.375 gm.; 1 equiv.) in 0.987 N potassium hydroxide (5.2 cc.; 1 equiv.) added. After 10 minutes at room temperature, by which time the pH had fallen from 10.5 to 6, 5.0 cc. of the resulting solution was treated with an excess of aqueous lead acetate, and the pale yellow precipitate filtered and washed. It was suspended in water (15 cc.) and treated with a stream of hydrogen sulphide for 40 minutes, when a deep brown solution was obtained. Boiling the solution, after addition of a little acetic acid, caused precipitation of lead sulphide. The filtrate was subjected to partition chromatography on a paper strip, using butanolacetic acid as the mobile phase, and shown, by comparison with authentic materials, to be a mixture of roughly equal parts of glycine ($R_F = .09$), DL-alanylglycine ($R_F = 0.13$) and DL-alanine ($R_F = 0.17$).

In a similar experiment on four-fifths of the above scale, the initial reaction solution was acidified during 2.5 hours with 2 equivalents of N hydrochloric acid. DL-4-methyl-2-thiothiazolidone was precipitated in 68% yield, but partition chromatography of the filtrate as above, showed that DL-alanylglycine had been synthesised, and was present in admixture with glycine and alanine.

We claim:

1. A process for the manufacture of amides of the general formula:

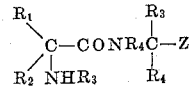

which comprises reacting a compound of the general formula:

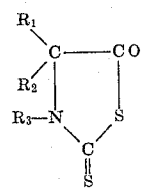

in a basic medium with a glycine derivative of the general formula:

wherein $R_1$, $R_2$, $R_3$ and $R_4$ are each selected from the group consisting of hydrogen and unsubstituted hydrocarbon residues, and Z is selected from the group consisting of carboxyl, esterified carboxyl, amide, substituted amide and nitrile groups, followed by acidification of the reaction mixture.

2. A process for the manufacture of glycylglycine ethyl ester which comprises reacting 2-thiothiazolone with glycine ethyl ester in a basic medium.

3. A process for the manufacture of glycylglycylglycine ethyl ester which comprises reacting 2-thiothiazolone with glycylglycine ethyl ester in a basic medium.

4. A process for the manufacture of glycylglycylglycylglycine ethyl ester which comprises reacting 2-thiothiazolone with glycylglycylglycine ethyl ester in a basic medium.

IAN HEILBRON.
ARTHUR HERBERT COOK.
ANTHONY LEWIS LEVY.

No references cited.